United States Patent
Lindtjørn et al.

(10) Patent No.: US 10,084,319 B2
(45) Date of Patent: Sep. 25, 2018

(54) POWER SYSTEM COMPRISING A CENTRAL ENERGY STORAGE SYSTEM AND A METHOD OF CONTROLLING POWER TRANSFER IN A POWER SYSTEM

(71) Applicant: ABB Schweiz AG, Baden (CH)

(72) Inventors: John Olav Lindtjørn, Oslo (NO); Frank Wendt, Oslo (NO)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/537,790

(22) PCT Filed: Oct. 16, 2015

(86) PCT No.: PCT/EP2015/073975
§ 371 (c)(1),
(2) Date: Jun. 19, 2017

(87) PCT Pub. No.: WO2016/096187
PCT Pub. Date: Jun. 23, 2016

(65) Prior Publication Data
US 2017/0353038 A1    Dec. 7, 2017

(30) Foreign Application Priority Data

Dec. 19, 2014  (EP) .................. 14199312.1

(51) Int. Cl.
*H02J 3/38*  (2006.01)
*H02J 7/34*  (2006.01)
(Continued)

(52) U.S. Cl.
CPC .................... *H02J 4/00* (2013.01); *H02J 3/32* (2013.01); *H02J 7/34* (2013.01)

(58) Field of Classification Search
CPC ................. H02J 4/00; H02J 7/34; H02J 3/32
See application file for complete search history.

(56) References Cited

U.S. PATENT DOCUMENTS 7,378,757 B2 *  5/2008  Nakata ............... H02J 7/35
                                                    307/71
7,557,464 B2 *  7/2009  Wang ................. H02M 1/10
                                                    307/65
(Continued)

FOREIGN PATENT DOCUMENTS

EP    2243700 A2    10/2010
EP    2654157 A1    10/2013
(Continued)

OTHER PUBLICATIONS

European Search Report Application No. 14199312.1 Completed: Jun. 10, 2015; dated Jun. 17, 2015 6 Pages.
(Continued)

*Primary Examiner* — Jared Fureman
*Assistant Examiner* — Esayas Yeshaw
(74) *Attorney, Agent, or Firm* — Whitmyer IP Group LLC

(57) ABSTRACT

A method of controlling power transfer in a power system including a main bus, having a first and second bus sections, the first bus section connectable to the second bus section, first and second power generating units connectable to the first and second bus sections, a first and second drive systems connectable to the first and second bus sections, a central energy storage system, and a control system. The first and second drive systems include first and second bi-directional power converters connectable to the central energy storage system, and wherein the control system is arranged to control the first bi-directional power converter to transfer power from the first drive system to the central energy storage system, and to control the second bi-directional power converter to transfer power from the central energy storage system to the second drive system.

18 Claims, 3 Drawing Sheets

(51) Int. Cl.
*H02J 3/06* (2006.01)
*H02J 4/00* (2006.01)
*H02J 3/32* (2006.01)

(56) References Cited

U.S. PATENT DOCUMENTS

| | | | |
|---|---|---|---|
| 7,880,342 B2 | 2/2011 | Bourgeau | |
| 2004/0102109 A1 | 5/2004 | Cratty et al. | |
| 2004/0155526 A1 | 8/2004 | Naden et al. | |
| 2004/0217732 A1* | 11/2004 | Zhu | B60L 11/1887 320/101 |
| 2009/0156068 A1 | 6/2009 | Barrett et al. | |
| 2009/0176417 A1* | 7/2009 | Rembach | B63H 21/20 440/6 |
| 2011/0096522 A1* | 4/2011 | Humphrey | H05K 7/1498 361/807 |
| 2011/0254368 A1* | 10/2011 | Boe | B63H 21/17 307/18 |
| 2011/0273010 A1* | 11/2011 | Tardy | H02J 3/04 307/9.1 |
| 2012/0043923 A1* | 2/2012 | Ikriannikov | H02J 1/10 320/103 |
| 2012/0139354 A1* | 6/2012 | Said | H02J 3/08 307/84 |
| 2012/0223524 A1* | 9/2012 | Williams | H02J 3/005 290/50 |
| 2014/0001863 A1 | 1/2014 | Zhang et al. | |
| 2014/0191507 A1* | 7/2014 | Holmberg | H02J 3/36 290/44 |
| 2014/0361621 A1* | 12/2014 | Lindtjorn | H02H 7/268 307/38 |
| 2015/0027124 A1* | 1/2015 | Hartig | B60L 11/08 60/702 |

FOREIGN PATENT DOCUMENTS

| | | |
|---|---|---|
| EP | 2709229 A1 | 3/2014 |
| WO | 9721265 A2 | 6/1997 |
| WO | 2013127575 A1 | 9/2013 |
| WO | 2014106712 A1 | 7/2014 |

OTHER PUBLICATIONS

Written Opinion of the International Preliminary Examining Authority Application No. PCT/EP2015/073975 dated Nov. 16, 2016 8 Pages.
International Preliminary Report on Patentability Application No. PCT/EP2015/073975 dated Mar. 2, 2017 8 Pages.
International Search Report and Written Opinion of the International Searching Authority Application No. PCT/EP2015/073975 Completed: Dec. 15, 2015; dated Dec. 22, 2015 12 Pages.

* cited by examiner

POWER SYSTEM COMPRISING A CENTRAL ENERGY STORAGE SYSTEM AND A METHOD OF CONTROLLING POWER TRANSFER IN A POWER SYSTEM

TECHNICAL FIELD

The present disclosure generally relates to power systems and in particular to a power system with redundancy capability, and to a method of controlling power transfer in a power system.

BACKGROUND

Power systems for powering motors may comprise a plurality of components, such as one or more power generation units, drives line-ups, energy storage modules and a main bus to which the aforementioned components are connectable. For reasons of safety, such systems may be designed with redundancy. This is important in e.g. marine applications, where for example in some applications it is essential that dynamic positioning of a vessel to maintain its position by using its propellers and thrusters can be guaranteed at all times.

For the purpose of redundancy, the main bus may comprise several bus sections, with each section having or being associated with a respective set of power generation units, drive line-up, and energy storage module. A drive line-up is a unit comprising a drive line-up DC bus and one or more drive units connectable to the drive line-up DC bus. Depending on the type of fault, a plurality of strategies may be applied in a fault situation. A faulty section may for example be disconnected from the healthy portion of the power system in the event of a main bus short circuit fault. According to one strategy, the local energy storage module may be controlled to feed the drive line-up of the faulty section in case additional power should be transferred to that drive line-up.

In a power system, tying sections together on the DC link level, i.e. at the internal drive line-up DC bus level, is a challenge due to the demands this places on the protective devices tying them together. Also, in the case of distributed energy storage banks it is not as easy to use "load factor" between banks to reduce the aggregate size of the banks. This results in oversized energy storage banks.

An example of a DC power system for marine vessels is disclosed in US 2004/0102109 A1. The DC power system comprises a DC propulsion power distribution unit comprising a plurality of main drive generators, each one connected to a respective rung coupled to two DC rails. The system further comprises a weaponry power distribution unit including two DC rails coupled to a plurality of rungs, each being coupled to a respective directed energy weapon. Each rung of the weaponry power distribution unit is coupled to a rung of the DC propulsion power distribution unit through DC-DC converters. An energy storage device, such as a superconducting magnetic energy storage device, is coupled to each rung of the weaponry power distribution unit. The energy storage device supplies high-intensity power bursts to the directed energy weapons.

As previously mentioned, energy storage banks are generally oversized/over-dimensioned. The price in kWh of an energy storage bank is very high, and has impact on the overall power system cost, resulting in the need of high capital investment and low flexibility in system design.

SUMMARY

An object of the present disclosure is to solve, or at least mitigate, the problems of the prior art.

According to a first aspect of the present disclosure there is provided a power system comprising a main bus comprising a first bus section and a second bus section, wherein the first bus section is connectable to the second bus section, a first power generating unit connectable to the first bus section, a second power generating unit connectable to the second bus section, a first drive system connectable to the first bus section, a second drive system connectable to the second bus section, a central energy storage system, and a control system, wherein the first drive system comprises a first bi-directional converter connectable to the central energy storage system, wherein the second drive system comprises a second bi-directional converter connectable to the central energy storage system, and wherein the control system is arranged to control the first bi-directional converter to transfer power from the first drive system to the central energy storage system, and to control the second bi-directional converter to transfer power from the central energy storage system to the second drive system.

The power available in an energy storage system may be subdivided into a reserve for back-up power, for longer term back-up operations, and a reserve for dynamic control for short-term dynamic control. The total power capacity of the central energy storage system according to the present disclosure may be significantly reduced compared to solutions which utilise one energy storage unit per system section, because it has been found to be sufficient that the central energy storage system is designed to have a back-up power reserve capacity similar to what would be required for one bus section, especially due to the power transfer availability between drive systems via the central energy storage system. In fact, taken to the extreme the energy storage capacity of the central energy storage system could almost be eliminated; instead of being a buffer on multi-minute level, it can be an energy buffer on second or millisecond level. This results in that the back-up power reserve capacity of the central energy storage system may be significantly lowered, in some cases about halved, compared to that of the total back-up power reserve made available in all energy storage units of a system added together in prior art solutions.

Furthermore, much better functionality concerning e.g. redundancy may be provided, and allows much greater flexibility in designs of power systems. In addition to reducing the required rating of the central energy storage system, both in terms of stored energy and possibly power, this configuration establishes an alternative path for power transfer between system sections which can be used for a variety of purposes, including improving availability of system sections.

According to one embodiment the control system is arranged to control the second bi-directional converter to transfer power from the second drive system to the central energy storage system, and to control the first bi-directional converter to transfer power from the central energy storage system to the first drive system.

According to one embodiment the control system is arranged to control the first bi-directional converter to transfer power from the central energy storage system to the first drive system, and to control the second bi-directional converter to transfer power from the central energy storage system to the second drive system.

According to one embodiment the first bi-directional converter and the second bi-directional converter are arranged to transfer power between the first drive system and the second drive system via the central energy storage system.

According to one embodiment the control system is arranged to control power transfer between the first bi-directional converter, the central energy storage system and the second bi-directional converter based on a required power capacity of each of the first drive system and the second drive system.

According to one embodiment the first drive system has a first drive system DC bus, wherein the first bi-directional converter is a first bi-directional DC-DC converter connected to the first drive system DC bus.

According to one embodiment the second drive system has a second drive system DC bus, wherein the second bi-directional converter is a second bi-directional DC-DC converter connected to the second drive system DC bus.

According to one embodiment the first drive system comprises a first drive unit connectable to a first electric motor and the second drive system comprises a second drive unit connectable to a second electric motor.

According to one embodiment the control system includes a first control loop to control the first bi-directional converter and a second control loop, decoupled from the first control loop, to control the second bi-directional converter.

One embodiment comprises a first switch arranged to connect the first drive system to and disconnect the first drive system from the central energy storage system and a second switch arranged to connect the second drive system to and disconnect the second drive system from the central energy storage system.

According to one embodiment the first switch is a disconnector and the second switch is a disconnector.

According to one embodiment the central energy storage system comprises N energy storage units, where N is an integer greater than 1, an energy storage system DC bus, and N switches arranged to connect a respective energy storage unit to the energy storage system DC bus.

According to one embodiment each of the N switches is a disconnector.

According to one embodiment the main bus comprises a bus-tie arranged to separate the first bus section from the second bus section.

According to one embodiment the power system is an on-board DC power system for a marine vessel.

According to a second aspect of the present disclosure there is provided a method of controlling power transfer in a power system comprising a main bus comprising a first bus section and a second bus section, wherein the first bus section is connectable to the second bus section, a first power generating unit connectable to the first bus section, a second power generating unit connectable to the second bus section, a first drive system connectable to the first bus section, a second drive system connectable to the second bus section, a central energy storage system, and a control system, wherein the first drive system comprises a first bi-directional converter connectable to the central energy storage system, wherein the second drive system comprises a second bi-directional converter connectable to the central energy storage system, wherein the method comprises controlling by means of the control system the first bi-directional converter to transfer power to the central energy storage system and controlling the second bi-directional converter to transfer power from the central energy storage system to the second drive system.

One embodiment comprises, prior to controlling the first bi-directional power converter, directly connecting the first bi-directional power converter to the central energy storage system and prior to controlling the second bi-directional power converter, directly connecting the second bi-directional power converter to the central energy storage system.

Generally, all terms used in the claims are to be interpreted according to their ordinary meaning in the technical field, unless explicitly defined otherwise herein. All references to "a/an/the element, apparatus, component, means", etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The power system disclosed herein may be an AC power system or a DC power system. The power system comprises a main bus that has two or more bus sections that can be connected/disconnected, and at least as many drive systems as bus sections. The drive systems are connectable to a respective bus section, and in some variations a bus section may be connected to more than one drive system.

The power system also comprises a central energy storage system. Each drive system comprises a bi-directional power converter that is arranged to transfer power between the central energy storage system and the corresponding drive system. Especially, the bi-directional power converters are directly connectable to the central energy storage system in the sense that the connections are not via the main bus. For this purpose, the power system comprises a control system that is arranged to control the energy flow direction of the bi-directional power converters. Each bi-directional power converter may thereby either push energy from its drive system to the central energy storage system or push energy from the central energy storage system to its drive system. Power may thereby be transferred from one drive system to another via the central energy storage system. Energy or power transfer between different drive systems may thereby be obtained. By controlling the bi-directional power converters by means of the control system, power stored in the central energy storage system may also be transferred directly from the central energy storage system to any one of the drive systems.

An example of a power system will now be described with reference to FIG. 1.

Figure 1:
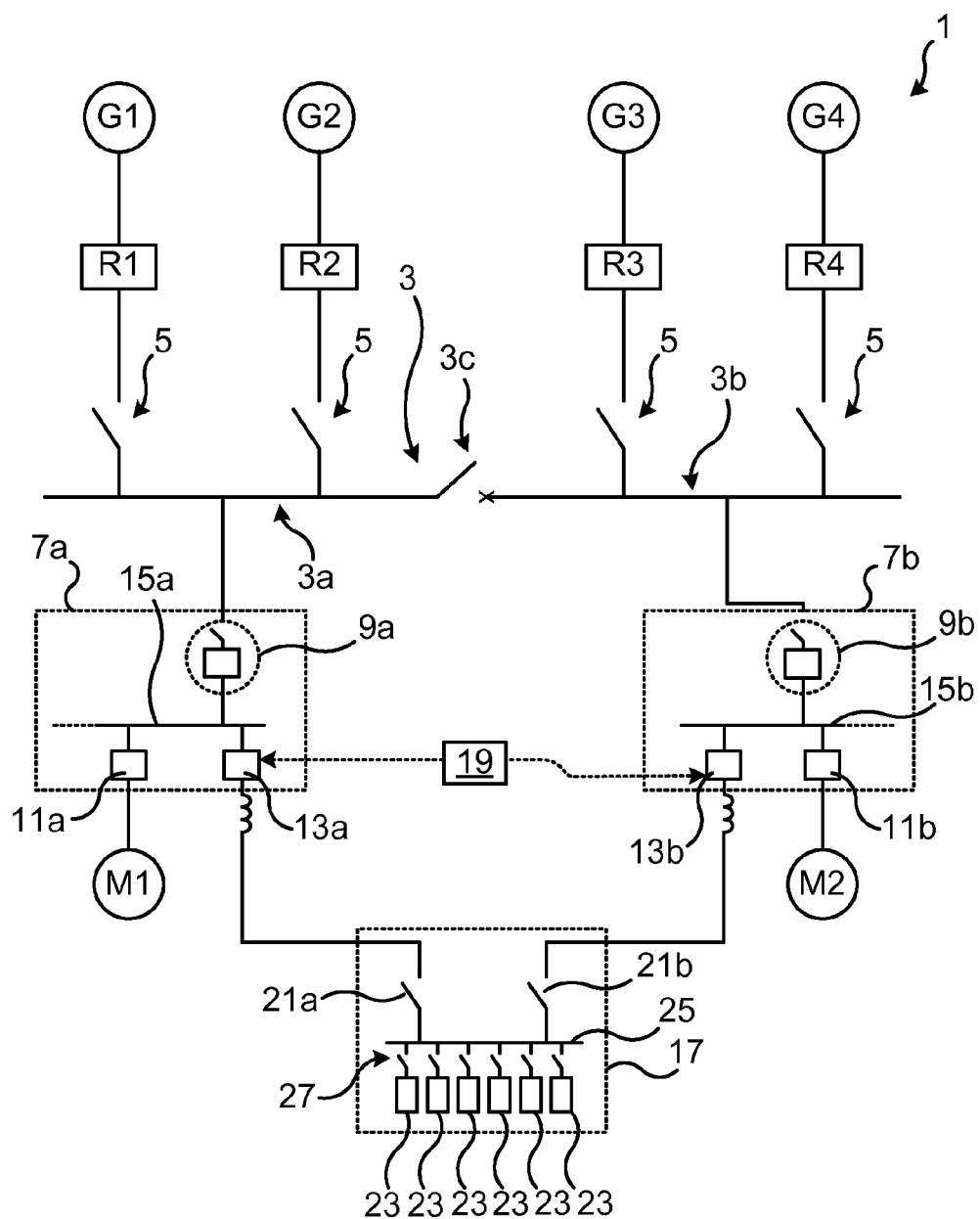
FIG. 1 is a schematic diagram of an example of a power system.

FIG. 1 schematically shows an example of a DC power system 1. The DC power system 1 comprises a main bus, namely a main DC bus 3, also known as a DC grid. The main DC bus 3 has a first bus section, namely a first DC bus section 3*a* and a second bus section, namely a second DC bus section 3*b*. The DC power system 1 further comprises a switch 3*c*, for example a bus-tie, which is arranged to connect and disconnect the first DC bus section 3*a* and the second DC bus section 3*b*. The DC power system 1 comprises power generating units G1 to G4. According to the example power generating units G1 and G2 are connectable to the first DC bus section 3*a* and power generating units G3 and G4 are connectable to the second DC bus section 3*b*. A first power generating unit G1 is for example connectable to the first DC bus section 3*a* and a second power generating unit G3 is for example connectable to the second DC bus section 3*b*.

Each power generating unit G1 to G4 may for example be an AC power source, e.g. a diesel generator. The DC power system 1 may thus comprise a plurality of rectifiers R1 to R4, one rectifier R1 to R4 for each power generating unit G1 to G4. Each rectifier R1 to R4 is arranged between a respective power generating unit G1 to G4 and connectable to the main DC bus 3. A first rectifier R1 is for example connectable between the first power generating unit G1 and the main DC bus 3 and a second rectifier R3 is connectable between the second power generating unit G3 and the main DC bus 3. Each rectifier R1 to R4 thus has a terminal connectable to a respective power generating unit G1 to G4 and a terminal connectable to the main DC bus 3.

The DC power system 1 may comprise protective devices 5 such as DC circuit breakers or disconnectors for disconnecting each one of the rectifiers from the main DC bus 3.

Although the exemplified DC power system 1 comprises two DC bus sections and four generators, it should be noted that the DC power system may have any number N of DC bus sections, N being equal to or greater than 2, and any number of power generating units per DC bus section.

The exemplified DC power system 1 comprises a first drive system 7*a* connectable to the first DC bus section 3*a* and a second drive system 7*b* connectable to the second DC bus section 3*b*. The first drive system 7*a* may thus comprise protective circuitry 9*a* that allows the first drive system 7*a* to be disconnected from the first DC bus section 3*a*, for example in the event of a drive system fault. The second drive system 7*b* may also comprise protective circuitry 9*b* that allows the second drive system 7*b* to be disconnected from the second DC bus section 3*b*, for example in the event of a drive system fault. An example of a suitable protection system for the drive units is disclosed in WO2013127575. It should however be noted that in the context of the present DC power system, traditional DC circuit breakers may alternatively be utilised.

The first drive system 7*a* comprises a first drive system DC bus 15*a*, or DC link, and one or more drive units 11*a* connectable to the first drive system DC bus 15*a*. Each drive unit 11*a* is arranged to drive a respective electric motor M1.

The second drive system 7*b* comprises a second drive system DC bus 15*b*, or DC link, and one or more drive units 11*b* connectable to the second drive system DC bus 15*b*. Each drive unit 11*b* is arranged to drive a respective electric motor M2.

As previously mentioned, each one of the first drive system 7*a* and the second drive system 7*b* may also be referred to as a drive line-up.

The DC power system 1 comprises a central energy storage system 17. The central energy storage system 17 may for example be a battery bank. The central energy storage system 17 is arranged to provide dynamic performance support to the loads of the DC power system 1, e.g. electric motors M1, M2, while the power generating units G1 to G4 are arranged to provide power to the loads for steady-state operation.

The central energy storage system 17 may according to one variation comprise N energy storage units 23, where N is an integer greater than 1, an energy storage system DC bus 25, and N switches 27 arranged to connect and disconnect a respective energy storage unit 23 to the energy storage system DC bus 25. Each of the N switches may be a circuit breaker or a disconnector. By connecting/disconnecting the energy storage units 23 to/from the energy storage system DC bus 25, the amount of energy available to the first DC bus section and the second DC bus section may be varied. The energy storage units 23 utilised may thus also be varied, as well as their recharging upon receiving energy from the first drive system and the second drive system, e.g. to improve the longevity of the energy storage units 23, to slow their energy storage capability degradation. According to one variation, each energy storage unit 23 is connectable to the energy storage system DC bus 25 via a respective fuse. The fuse may either replace the corresponding switch, or be provided in addition to the switch.

The first drive system 7*a* comprises a first bi-directional power converter, namely a first bi-directional DC-DC converter 13*a*. The first bi-directional DC-DC converter 13*a* is connectable to the first drive system DC bus 15*a* and to the central energy storage system 17. The second drive system 7*b* comprises a second bi-directional power converter, namely a second bi-directional DC-DC converter 13*b*. The second bi-directional DC-DC converter 13*b* is connectable to the second drive system DC bus 15*b* and to the central energy storage system 17.

The DC power system 1 comprises a control system 19. The control system 19 is arranged to control the first bi-directional DC-DC converter 13*a* and the second bi-directional DC-DC converter 13*b*, enabling bi-directional power transfer or energy transfer between the bi-directional DC-DC converters 13*a*, 13*b* and the central energy storage system 17. For example, the control system 19 is arranged to control the first bi-directional DC-DC converter 13*a* to transfer power to the central energy storage system 17, and to control the second bi-directional DC-DC converter 13*b* to transfer power from the central energy storage system 17 to the second drive system 7*b*. Energy transfer between the first drive system 7*a* and the second drive system 7*b* may thus in a simple manner be provided via the central energy storage system 17. The establishment of another path of power transfer between sections becomes simpler because the central energy storage de-couples the two or more bi-directional power converters that are controlling the power flow from one section to another. As an example, when one bi-directional power converter feeds power into the central energy storage system and the other passes it on to another section the central energy storage system works as a buffer so that the power through one bi-directional power converter does not have to match that of the other bi-directional power converter exactly. If there was no central energy storage system, the controls in the bi-directional power converters would have to match each other exactly, which can be challenging.

The control system 19 may according to one variation include a first control loop to control the first bi-directional DC-DC converter 13*a* and a second control loop, decoupled from the first control loop due to the energy buffer provided by the central energy storage system 17, to control the second bi-directional DC-DC converter 13*b*.

The DC power system 1 may according to one variation comprise a first switch 21a and a second switch 21b arranged to disconnect the first drive system 7a and the second drive system 7b, respectively, from the central energy storage system 17. The first switch 21a and the second switch 21b may for example be circuit breakers or disconnectors. Thereby the DC bus sections can be physically segregated/isolated from each other, allowing re-configuration of the DC power system 1 and simpler service work on equipment. Each drive system could according to one variation further comprise a respective dedicated fuse for the bi-directional DC-DC converter. Alternatively, the first switch 21a and the second switch 21b could be replaced with a respective fuse.

Figure 2:
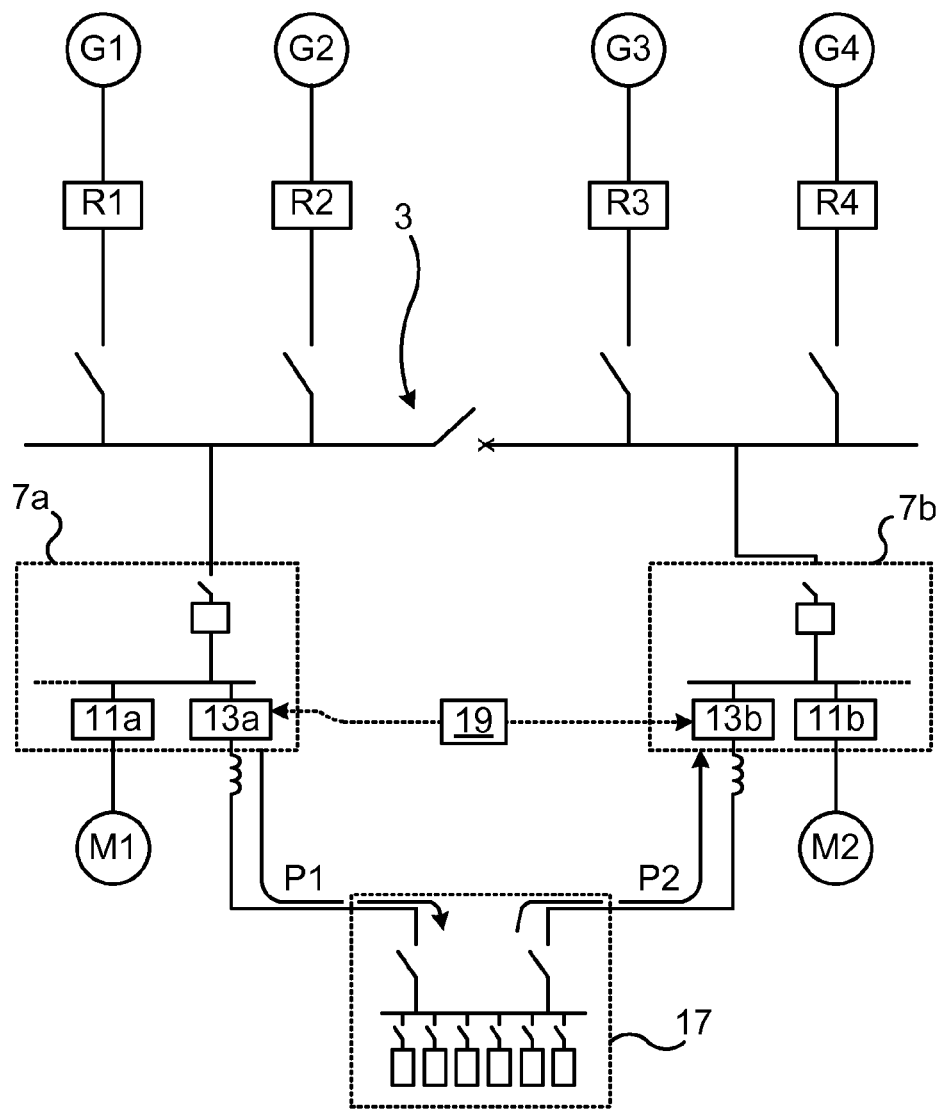
FIG. 2 is a schematic diagram of a first example of operation of the DC power system in FIG. 1.

With reference to FIG. 2, a first example of the operation of the DC power system 1 will be described. In this example, the second drive system 7b is in the need of additional power in order to be able to operate the electric motor M connected to drive unit 11b. The need for additional power may for example have occurred due to a fault in one or more of the power generating units G3, G4, resulting in the need of a longer-term power transfer from the central energy storage system 17, or due to the need of a brief power injection for dynamic control of the electric motor M2 connected to the drive unit 11b.

The control system 19 thus controls the first bi-directional DC-DC converter 13a to transfer or push power or energy P1 to the central energy storage system 17. The control system 19 controls the second bi-directional DC-DC converter 13b to transfer or push power or energy P2 from the central energy storage system 17 to the second drive system 7b. The control system 19 may thus send a control signal to the first bi-directional DC-DC converter to push energy from the drive unit 11a to the central energy storage system 17. The control system 19 may also send a control signal to the second bi-directional DC-DC converter to push energy from the central energy storage to the drive unit 11b.

Energy thus flows into the central energy storage system 17 from the first drive system 7a and out from the central energy storage system 17 to the second drive system 7b. The central energy storage system 17 hence acts as an energy buffer, and enables power transfer between the first DC bus section 3a and the second DC bus section 3b.

Figure 3:
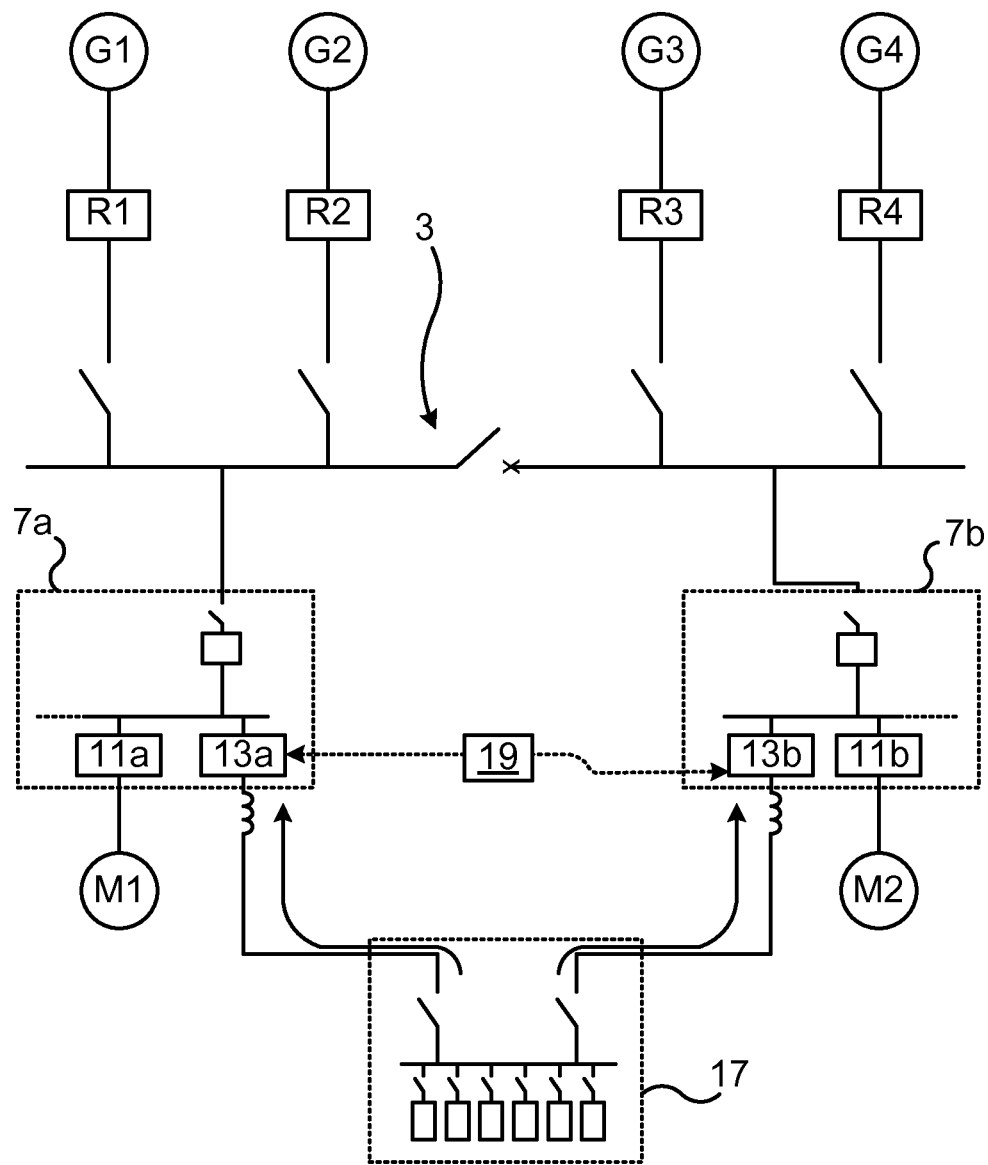
FIG. 3 is a schematic diagram of a second example of operation of the DC power system in FIG. 1.

With reference to FIG. 3, a second example of the operation of the DC power system 1 will be illustrated. In this example, both the first drive unit 7a and the second drive unit 7b are in need of additional power simultaneously. There could however also be a scenario in which only one of the first drive unit 7a and the second drive unit 7b would require additional energy. In the present example, the control system 19 controls both the first bi-directional DC-DC converter and the second bi-directional DC-DC converter to transfer power, or push energy, from the central energy storage system 17. The first drive system 7a and the second drive system 7b are thereby provided with energy that has been stored in the central energy storage system 17.

The DC power system may according to one variation comprise a third drive system, i.e. drive line-up or drive line, connectable e.g. to the first DC bus section. This drive system comprises a third bi-directional DC-DC converter, and the control system is arranged to control also the third bi-directional DC-DC converter. The control system is arranged to control the third bi-directional DC-DC converter to transfer power or push energy from the third drive system to the central energy storage system, and to control the third bi-directional DC-DC converter to transfer power or push energy from the central energy storage system to the third drive system. An alternative route for energy flow within a single DC bus section may thereby be provided.

By means of a central energy storage system 17 that is able to feed several drive systems via the dedicated bi-directional DC-DC converters, the size of the central energy storage system 17, in particular of the energy storage unit(s) contained in the central energy storage system 17 can be designed in a more optimal manner. It furthermore provides an alternative route for power between drive systems and/or system sections.

As an alternative to a DC power system, the power system could be an AC power system. In this case, the main bus is a main AC bus or AC network, and each drive system comprises a respective rectifier. The drive systems may thereby be connected to the main AC bus. The first bi-directional power converter and the second bi-directional power converter may be a first bi-directional DC-DC converter and a second bi-directional DC-DC converter, connectable to the central energy storage system and to a respective drive system DC bus. The control of the first bi-directional DC-DC converter and the second bi-directional DC-DC converter by means of the control system is identical to the one of a DC power system, described above.

Alternatively, the rectifier arranged to connect a drive system may be a bi-directional rectifier, in which case the bi-directional rectifier of that drive unit may replace the function of a bi-directional DC-DC converter. The control system may thus control the bi-directional rectifier to push energy from the main AC bus to a drive system, and if more energy is pushed by the bi-directional rectifier to a drive system than what is used by the inverter(s) of that drive system, the remaining energy flows to the central energy storage system. The central energy storage system is in this case directly connected to the drive system DC bus, i.e. without any power converter arranged therebetween. Furthermore, if power is to be pushed to a drive system from the central energy storage system, this will occur if the bi-directional rectifier does not push enough energy from the main AC bus to the inverter(s) of the drive system. In this case, the "lacking power" will be delivered from the central energy storage system. There is hence an energy balance in each drive system, with energy either being pushed from the central energy storage unit or to the central energy storage unit.

It should be noted that also in the AC power system case, there could be several drive systems from the same bus section of the main bus could be connectable to the central energy storage system.

The power systems described herein may advantageously be used as an on-board power system for powering a marine vessel, for example for marine vessels utilising dynamic positioning. Examples of such vessels are cable-laying vessels, drillships, floating production, storage and offloading units (FPSO), semi-submersibles, and oil platforms. The present power system is typically used in a low voltage environment, although higher voltage applications, e.g. medium voltage, are also envisaged.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A power system comprising:
   a main bus comprising a first bus section and a second bus section, a main switch configured to connect and disconnect the first bus section and the second bus section, a first power generating unit configured to be connected to the first bus section, a second power generating unit configured to be connected to the second bus section, a first drive system configured to be connected to the first bus section, a second drive system configured to be connected to the second bus section, wherein the first drive system and the second drive system are configured to be connected and segregated by means of the main switch, a central energy storage system, and a control system, wherein the first drive system comprises a first bi-directional power converter configured to be directly connected to the central energy storage system, wherein the second drive system comprises a second bi-directional power converter configured to be directly connected to the central energy storage system, wherein the control system is arranged to control the first bi-directional power converter to transfer power from the first drive system to the central energy storage system, and to control the second bi-directional power converter to transfer power from the central energy storage system to the second drive system, and wherein the control system includes a first control loop to control the first bi-directional power converter and a second control loop, decoupled from the first control loop, to control the second bi-directional power converter.

2. The power system as claimed in claim 1, wherein the control system is arranged to control the second bi-directional power converter to transfer power from the second drive system to the central energy storage system, and to control the first bi-directional power converter to transfer power from the central energy storage system to the first drive system.

3. The power system as claimed in claim 2, wherein the control system is arranged to control the first bi-directional power converter to transfer power from the central energy storage system to the first drive system, and to control the second bi-directional power converter to transfer power from the central energy storage system to the second drive system.

4. The power system as claimed in claim 1, wherein the control system is arranged to control the first bi-directional power converter to transfer power from the central energy storage system to the first drive system, and to control the second bi-directional power converter to transfer power from the central energy storage system to the second drive system.

5. The power system as claimed in claim 1, wherein the first bi-directional power converter and the second bi-directional power converter are arranged to transfer power between the first drive system and the second drive system via the central energy storage system.

6. The power system as claimed in claim 1, wherein the control system is arranged to control power transfer between the first bi-directional power converter, the central energy storage system and the second bi-directional power converter based on a required power capacity of each of the first drive system and the second drive system.

7. The power system as claimed in claim 1, wherein the first drive system has a first drive system DC bus, wherein the first bi-directional power converter is a first bi-directional DC-DC converter connected to the first drive system DC bus.

8. The power system as claimed in claim 1, wherein the second drive system has a second drive system DC bus, wherein the second bi-directional power converter is a second bi-directional DC-DC converter connected to the second drive system DC bus.

9. The power system as claimed in claim 1, wherein the first drive system comprises a first drive unit connectable to a first electric motor and the second drive system comprises a second drive unit connectable to a second electric motor.

10. The power system as claimed in claim 1, comprising a first switch arranged to connect the first drive system to and disconnect the first drive system from the central energy storage system and a second switch arranged to connect the second drive system to and disconnect the second drive system from the central energy storage system.

11. The power system as claimed in claim 10, wherein the first switch is a disconnector and the second switch is a disconnector.

12. The power system as claimed in claim 1, wherein the central energy storage system comprises N energy storage units, where N is an integer greater than 1, an energy storage system DC bus, and N switches arranged to connect a respective energy storage unit to the energy storage system DC bus.

13. The power system as claimed in claim 12, wherein each of the N switches is a disconnector.

14. The power system as claimed in claim 1, wherein the main switch is a bus-tie arranged to separate the first bus section from the second bus section.

15. The power system as claimed in claim 1, wherein the power system is an on-board DC power system for a marine vessel.

16. A method of controlling power transfer in a power system comprising a main bus comprising a first bus section and a second bus section, wherein the first bus section is configured to be connected to the second bus section, a first power generating unit configured to be connected to the first bus section, a second power generating unit configured to be connected to the second bus section, a first drive system configured to be connected to the first bus section, a second drive system configured to be connected to the second bus section, wherein the first drive system and the second drive system are configured to be connected and segregated by means of a switch, a central energy storage system, and a control system, wherein the first drive system comprises a first bi-directional power converter configured to be directly connected to the central energy storage system, wherein the second drive system comprises a second bi-directional power converter configured to be directly connected to the central energy storage system, wherein the method comprises:

controlling by means of the control system the first bi-directional power converter to transfer power to the central energy storage system and controlling the second bi-directional power converter to transfer power from the central energy storage system to the second drive system; and prior to controlling the first bi-directional power converter, directly connecting the first bi-directional power converter to the central energy storage system, and prior to controlling the second bi-directional power converter, directly connecting the second bi-directional power converter to the central energy storage system.

17. A power system comprising:
a main bus comprising a first bus section and a second bus section,
a main switch configured to connect and disconnect the first bus section and the second bus section,
a first power generating unit configured to be connected to the first bus section,
a second power generating unit configured to be connected to the second bus section,
a first drive system configured to be connected to the first bus section,
a second drive system configured to be connected to the second bus section, wherein the first drive system and the second drive system are configured to be connected and segregated by means of the main switch,
a central energy storage system,
a control system, and
a first switch arranged to connect the first drive system to and disconnect the first drive system from the central energy storage system and a second switch arranged to connect the second drive system to and disconnect the second drive system from the central energy storage system,
wherein the first drive system comprises a first bi-directional power converter configured to be directly connected to the central energy storage system,
wherein the second drive system comprises a second bi-directional power converter configured to be directly connected to the central energy storage system, and
wherein the control system is arranged to control the first bi-directional power converter to transfer power from the first drive system to the central energy storage system, and to control the second bi-directional power converter to transfer power from the central energy storage system to the second drive system.

18. A power system comprising:
a main bus comprising a first bus section and a second bus section,
a main switch configured to connect and disconnect the first bus section and the second bus section,
a first power generating unit configured to be connected to the first bus section,
a second power generating unit configured to be connected to the second bus section,
a first drive system configured to be connected to the first bus section,
a second drive system configured to be connected to the second bus section, wherein the first drive system and the second drive system are configured to be connected and segregated by means of the main switch,
a central energy storage system, and
a control system,
wherein the first drive system comprises a first bi-directional power converter configured to be directly connected to the central energy storage system,
wherein the second drive system comprises a second bi-directional power converter configured to be directly connected to the central energy storage system,
wherein the control system is arranged to control the first bi-directional power converter to transfer power from the first drive system to the central energy storage system, and to control the second bi-directional power converter to transfer power from the central energy storage system to the second drive system, and
wherein the central energy storage system comprises N energy storage units, where N is an integer greater than 1, an energy storage system DC bus, and N switches arranged to connect a respective energy storage unit to the energy storage system DC bus.

* * * * *